3,663,514
LIGHT-STABLE POLYURETHANE COATINGS
Robert W. Campbell and Ralph P. Williams, Bartlesville, Okla., assignors to Phillips Petroleum Company
No Drawing. Filed Apr. 9, 1970, Ser. No. 27,108
Int. Cl. C08g 22/18
U.S. Cl. 260—77.5 AT          10 Claims

ABSTRACT OF THE DISCLOSURE

A polyol is reacted with a diisocyanate to produce a first compound having available for further reaction unreacted isocyanate groups. The first compound is cured to produce a polyurethane compound having improved light stability. The diisocyanate useful in this invention is represented by the formula:

$$OCN—R_1—R_2—R_3—NCO$$

wherein the —NCO group attached to $R_1$ is more reactive than the —NCO group attached to $R_3$ and $R_1$ is an aromatic group, $R_2$ is an aliphatic group or a direct bond, and $R_3$ is a 1,4-cyclohexylene group.

FIELD OF THE INVENTION

This invention relates to polyurethane compounds. This invention further relates to polyurethane compounds prepared from diisocyanate compounds having isocyanate groups of differing reactivity. This invention still further relates to polyurethane compounds prepared from diisocyanates having an isocyanate group attached to an aromatic ring and an isocyanate group attached to an aliphatic structure in the same molecule.

BACKGROUND OF THE INVENTION

Polyurethane coatings are known to be useful in those applications where a durable, protective surface is required. Wood finishes and aircraft and golf ball coatings are examples of such uses, and recently polyurethane coatings have been suggested for use as pourable, seamless, floor coverings.

Polyurethanes known in the prior art have had their usefulness as coatings limited, however, due to certain problems involving light-stability and toxicity. Environmental stability is a desirable feature in coatings, but light-stability is a requirement not easily met even by those polyurethane coatings that may be otherwise acceptable. Polyurethanes derived solely from aromatic diisocyanates are easily applied, but they are known to be characteristically prone to discolor or yellow upon exposure to sunlight. Polyurethanes derived solely from aliphatic diisocyanates resist yellowing, but often require elevated temperatures in their preparation and application which is a source of inconvenience and which can lead to poor quality coatings occasioned by premature gelation. Furthermore, the coat of aliphatic diisocyanates and the expense involved in their application has limited their use.

Polyurethane compounds to be widely used as coatings, especially as floor covering materials, should exhibit negligible vapor toxicity. Toxic vapors associated with polyurethane coatings have their origin in unreacted diisocyanate molecules caused by incomplete utilization of the molecules during preparation of the coating. The residual unreacted diisocyanate molecules can and do diffuse with time from the surface of the coating to thereby create a toxicity hazard, especially in an area enclosing an interior floor surface.

THE INVENTION

It is thus an object of this invention to provide a process for preparing a novel polyurethane coating having a low toxic vapor hazard and which is highly resistant to light promoted yellowing.

It is another object of this invention to provide a novel prepolymer compound having available for reaction isocyanate groups of about equal reactivity prepared from a diisocyanate having isocyanate groups of differing reactivity.

It is still another object of this invention to provide an improved process for preparing a diisocyanate having isocyanate groups of differing reactivity.

Other objects, aspects, and the various advantages of this invention will become apparent to those skilled in the art from consideration of the following specification, examples and appended claims.

We have now discovered a novel class of prepolymer compounds produced by the reaction of a diisocyanate and and a polyol. The diisocyanate reactant is characterized by the fact that one of its two isocyanate groups is less reactive than the other. Accordingly, to produce the prepolymer compound of this invention, only that amount of polyol sufficient to react with the more reactive isocyanate group is added to the diisocyanate. The product of this reaction, which is the prepolymer compound of this invention, has available for further reaction the less reactive isocyanate groups of the original diisocyanate reactant.

The number of available isocyanate groups per molecule of prepolymer is dependent on the polyol reacted with the diisocyanate. For example, 1 mole of diol produces 1 mole of prepolymer having two available isocyanate groups, and 1 mole of triol produces 1 mole of prepolymer having three available isocyanate groups per molecule. Also, mixtures of polyols produce mixtures of prepolymers having differing numbers of available isocyanate groups. For example, when 1 mole of diol and 1 mole of triol are reacted with 5 moles of diisocyanate there is produced 1 mole of prepolymer having available 2 isocyanate groups and 1 mole of prepolymer having available 3 isocyanate groups. Therefore, in general, when reacting the diisocyanate with the polyol(s) to produce the prepolymer of this invention, sufficient amounts of polyol and diisocyanate are combined to produce a ratio of isocyanate groups to hydroxy groups of about 2 to 1 (NCO:OH::2:1).

The prepolymer of this invention is useful to produce a novel polyurethane compound which is characterized by its resistance to yellowing caused by light, probably within the ultraviolet spectrum. The light stability feature of the polyurethane compound makes it useful in coating applications where poor light stability resulting in yellowing of the coating is an undesirable feature. Also, due to the reactivity difference between the isocyanate groups of the original diisocyanate coupled with the use of the above mentioned 2 to 1 isocyanate to hydroxyl ratio, competing polyol-diisocyanate chain growth reactions are precluded thus providing the complete utilization of the original diisocyanate reactant with the result that the polyurethane compound is further characterized by its low toxic vapor hazard which enhances its utility as a coating product. The preparation of this novel polyurethane compound will be more fully disclosed at another point herein.

DESCRIPTION OF THE INVENTION

The prepolymer

The prepolymer compound of this invention is represented by the general formula, $$R_4(O_2CNH—R_1—R_2—R_3—NCO)_y$$

and is prepared by reaction of a diisocyanate with a polyol according to the general equation, $$R_4(OH)_y + OCN—R_1—R_2—R_3—NCO \rightarrow$$
$$R_4(O_2CNH—R_1—R_2—R_3—NCO)_y$$

wherein $R_1$ is an aromatic group, $R_2$ is an aliphatic group, $R_3$ is an aromatic, aliphatic or a cycloaliphatic group, $R_4$ is the aliphatic portion of a polyol and $y$ is an integer equal to the number of hydroxyl groups in the polyol.

The reaction is conducted in solution wherein there are sufficient quantities of diisocyanate and polyol present to produce an isocyanate to hydroxyl ratio in the range of 1.5:1 to 2.5:1 and preferably in the range of 1.8:1 to 2.2:1. The solution comprises the diisocyanate and polyol, which together occupy 40 to 60 percent by weight of the solution, and a suitable solvent which occupy 40 to 60 percent by weight of the solution.

The diisocyanate, polyol, and solvent are charged to a stirred reaction vessel in amounts within the above mentioned ranges. The order of charging is not critical and any charge order is acceptable. The solution is stirred and heated to maintain a reduction temperature within the range of 30° to 70° C. and preferably in the range of 40° to 60° C. until the reaction is complete which requires a time in the range of 10 to 18 hours and usually in the range of 12 to 16 hours. The reaction is carried out under anhydrous conditions at atmospheric pressure. Although the quantities of diisocyanate and polyol required can be conveniently calculated to produce the desired prepolymer having an unreacted isocyanate content equal to the amount of lesser reactive isocyanate present in the diisocyanate charged, it is good practice periodically during the reaction to determine the number of isocyanate groups present per unit weight of prepolymer by conventional means such as by the method set out in ASTM D1638–59T. When the periodic analyses indicate that the theoretical free isocyanate content is attained, heating is terminated.

The prepolymer product, which is in solution form, the original reaction solvent still being present, is liquid at room temperature, i.e., 65 to 90° F., with no premature gelation occurring. The prepolymer product solution can be conveniently stored for a period of time of at least one year without undesirable effects providing the storage vessel is free of reactive hydroxyl groups and/or basic sites.

The diisocyanate useful herein which, as previously noted and defined, is represented by the general formula

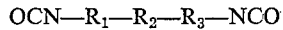

$$OCN-R_1-R_2-R_3-NCO$$

is characterized by the fact that the isocyanate group connected to the $R_1$ (aromatic) group is more reactive than the isocyanate group connected to the $R_3$ (aromatic, aliphatic or cycloaliphatic) group. The diisocyanate is further characterized by the fact that the two isocyanate groups occupy positions as distant from one another as a particular diisocyanate will permit. This spatial relationship minimizes steric inhibition of reaction at the isocyanate groups of the diisocyanate. That, coupled with the significant reactivity difference between the two isocyanate groups in the diisocyanate, promotes the complete utilization of the more reactive isocyanate group in the formation of prepolymers.

The $R_1$ group, as previously mentioned, is an aromatic structure. It can also be a substituted aromatic structure wherein the substituents are characterized by the absence of reactive hydrogen atoms. Examples of $R_1$ groups useful herein include 1,4-phenylene, 3-methyl-1,4-phenylene, 1,4-naphthalene, 2-phenyl-1,4-phenylene, 3-fluoro-1,4-phenylene and the like.

The $R_2$ group, as previously noted, is an aliphatic structure. When the $R_3$ as well as the $R_1$ group is a ring structure, the number of carbon atoms in the $R_2$ group is in the range of 1 to 20 and preferably in the range of 1 to 6. Also, when $R_3$ and $R_1$ are both ring structures, it is not necessary that $R_2$ be present. That is, the two rings can be directly connected without the intervention of an intermediate aliphatic agency. The $R_2$ group can be a substituted aliphatic structure wherein one or more methylene hydrogen atoms are replaced by alkyl groups or other substituents. Dimethylmethylene, 1-methyl-1,3-propylene, 2-fluoro-1,4-butylene, 3-phenyl-1,5-pentylene and the like are examples of suitable $R_2$ groups.

When the $R_3$ group is not a ring structure, the $R_2$ group and $R_3$ group merely combine to form one chain structure having 2 to 40 and preferably 5 to 16 carbon atoms. The combined structure can also be a substituted aliphatic structure defined as for $R_2$ above.

The $R_3$ group, as previously mentioned, is an aromatic, aliphatic or cycloaliphatic structure. When the $R_3$ as well as the $R_1$ group is an aromatic structure, the two aromatics must differ sufficiently in substituent groups present in order to provide the required reactivity differences between the respective isocyanate groups. One example of a diisocyanate compound wherein both the $R_1$ and $R_3$ structures are aromatics features $R_1$ having a nitro group in each position ortho to the isocyanate and $R_3$ having a methoxyl group in each position ortho to the isocyanate group. This structure satisfies the requirement that the isocyanate or $R_1$ be more reactive than the isocyanate on $R_3$.

The $R_3$ group, when it is a cycloaliphatic, can be substituted or unsubstituted. When it is substituted the substituents are characterized by the absence of reactive hydrogen atoms.

Examples of cycloaliphatic $R_3$ groups useful herein include 1,4-cyclohexylene, 3-methoxy-1,4-cyclohexylene, 2-chloro-1,4-cyclohexylene, 3-ethyl-1,4-cyclohexylene and the like.

Examples of diisocyanates useful herein include

4-[(p-isocyanatophenyl)methyl]cyclohexyl isocyanate,
4-[(p-isocyanatotetrafluorophenyl)methyl]cyclohexyl isocyanate,
2-(p-isocyanatophenyl)-2-(4-isocyanatocyclohexyl)propane,
3-methyl-4-[(3-methyl-4-isocyanatophenyl)methyl]cyclohexyl isocyanate,
3-(p-isocyanatophenyl)propyl isocyanate, and
3,5-dinitro-4-isocyanatophenyl-3,5-dimethoxy-4-isocyanatophenylmethane.

It was previously indicated that a novel polyurethane compound is prepared from the novel prepolymer of this invention. The preferred diisocyanate used to prepare the prepolymer which is ultimately used to prepare the preferred polyurethane compound is an aromatic-cycloaliphatic structure wherein $R_1$ is 1,4-phenylene, $R_2$ is a methylene group, and $R_3$ is 1,4-cyclohexylene. This diisocyanate, 4-[(p-isocyanatophenyl)methyl]cyclohexyl isocyanate will be more fully discussed below in connection with the polyurethane compound.

The polyol useful herein to prepare the prepolymer compound of this invention is dependent upon the method utilized to cure the prepolymer to form the ultimate polyurethane coating. There are several available cure methods which can be used, two of which are the "polyol" and the "atmospheric moisture" cure method. The particular cure method utilized dictates that the polyol used to prepare the prepolymer be within a particular weight range. Thus, the molecular weight range of polyols used to prepare the prepolymer is quite broad. In general, the polyol used to prepare the prepolymer compound of this invention is selected from the group comprising aliphatic and cycloaliphatic diols, triols and mixtures thereof having a molecular weight in the range of 60 to 5000 and preferably in the range of 80 to 3000. Higher polyols than triols can be used in only minor amount but it is preferred that such polyols not be present at all. When mixtures of diols and triols are combined to produce the prepolymers of this invention care must be taken to mix the diols, triols and diisocyanates in proportions which will provide isocyanate to hydroxyl ratios within the ratios previously specified. For example, a diol, a triol, and a diisocyanate combined in the molar ratio of 1 to 1 to 5 respectively produces an isocyanate to hydroxy ratio within the specified range.

When the polyol cure method is utilized to cure the prepolymer of this invention it is preferred that the polyol used to prepare the prepolymer have a molecular weight in the range of 60 to 300 and preferably in the range of 80 to 150. Examples of useful polyols within this weight range include ethylene glycol, 1,3-butylene glycol, 2,5-hexanediol, 1,4-cyclohexanediol, trimethylol-propane, 1, 2,6-hexanetriol and the like.

When the atmospheric moisture cure method is utilized to cure the prepolymer of this invention there is included with the polyols mentioned above polyols having molecular weights in the range of 400 to 5000 and preferably in the range of 700 to 3000. The purpose of the higher molecular weight polyols is to impart flexibility to the final coating, accordingly, the relative proportions of lower and higher molecular weight polyols used is governed by the degree of final coating flexibility desired. Examples of higher molecular weight polyols useful in combination with the previously mentioned lower molecular weight polyols to prepare the moisture curing prepolymer include: Niax triol LHT–112 and Niax triol LHT–240, both being poly(oxypropylene) triols of 1,2,6-hexane triol having hydroxyl numbers in the range of 110–250; Niax diol PPG–425, Niax diol PPG–1025, and Niax diol PPG–2025, being poly(oxypropylene) diols, having hydroxyl numbers in the range 50 to 270; the Niax triols and Niax diols are products of Union Carbide Chemical Company; also useful are Desmophen 650, Multron R–2, Multron R–4, and Multron R–22, which are polyester polyols with hydroxyl numbers in the range of 130–430 which are products of Mobay Chemical Company.

It was previously mentioned that the prepolymer of this invention is used to prepare a novel polyurethane compound. The prepolymer preferred in the preparation of the polyurethane is prepared by reacting a mixture of diols and triols with the above mentioned preferred diisocyananate. The preferred diol is 1,3-butylene glycol, and the preferred triol is trimethylolpropane.

The solvent useful in the preparation of the prepolymer compound is preferably one having a boiling point in excess of the specified 70° C. maximum reaction temperature, and more preferably one having a boiling point in excess of 100° C. Any organic solvent meeting the boiling point limitation and devoid of reactive hydrogen atoms can be used and especially useful are the acetate solvents which meet the boiling point limitation.

Examples of solvents include 2-ethoxyethyl acetate (Cellosolve acetate), isoamyl acetate, butyl acetate and the like.

The polyurethane

It has been indicated previously that the novel prepolymer of this invention is used to prepare a novel polyurethane which is useful as a coating. The polyurethane is characterized by its light stability and also by its low toxic vapor hazard.

The polyol cure process for the production of the novel polyurethane of this invention comprises the reaction of a prepolymer component with a polyol component in the presence of a catalyst component and a solvent component wherein the prepolymer component is the novel prepolymer of this invention, and further wherein the prepolymer component and polyol component are initially present in the reaction in sufficient quantities to provide a ratio of isocyanate groups to hydroxyl groups in the range of 1:1 to 1.5:1 and preferably in the range of 1.1:1 to 1.3:1. The number of isocyanate groups per unit weight of prepolymer is determined by conventional means such as by the method set out in ASTM D1638–59T. The number of hydroxyl groups per unit weight of polyoyl is also determined by conventional means such as by the hydroxyl number method. Knowing the isocyanate and hydroxyl contents respectively, the appropriate weights of prepolymer and polyol are combined to provide the above specified isocyanate to hydroxyl ratio.

The compounding recipe utilized in the polyol cure process involves mixing the above named components in certain proportions by weight. The combined prepolymer-polyol component, wherein the prepolymer component and the polyol component are present in sufficient quantities to satisfy the specified isocyanate to hydroxy ratio, is present to the extent of 30 to 70, preferably 40 to 60, percent by weight of the total weight of the components. The catalyst component is present to the extent of 0.01 to 0.2, preferably 0.03 to 0.07, percent by weight of the total weight of the components, and the solvent component is present to the extent of 30 to 70, preferably 40 to 60, percent by weight of the total weight of the components.

The mixing order and conditions of mixing are not critical to the blending of the components. However, it is good practice to combine the prepolymer, polyol, and solvent components before the catalyst component is added.

The polyurethane compound, being the reaction product of the prepolymer and polyol, is liquid at ambient temperature conditions while in the presence of the quantity of solvent initially present, therefore, it is not necessary to warm the compound during its application as a coating to a substrate. The polyurethane can be applied to various surfaces including, but not limited to, glass, metal, such as aluminum and steel, wood, and concrete. After the coating is applied the solvent is allowed to evaporate to produce a hard, smooth, glossy, clear film.

The results obtained using this compound as a coating are surprising when compared with similar coatings prepared from closely related diisocyanates. This comparison is fully set out in Example 5 herein.

The solvent evaporation conveniently proceeds at temperatures in the range of 0° to 150° C., preferably 15° to 70° C., with the film tack free after about 8 to 24 hours. There is slight additional increase in hardening occurring after 24 hours of drying time.

The prepolymer used to prepare the polyurethane compound was disclosed previously herein. Briefly, then, the prepolymer is the reaction product of a diisocyanate and a polyol, wherein the diisocyanate has one isocyanate group which is more reactive than the other isocyanate group, and only that amount of polyol sufficient to react with the more reactive isocyanate group is added to the diisocyanate.

The prepolymer used to prepare the preferred polyurethane compound is the reaction product of 4-[(p-isocyanatophenyl)methyl]cyclohexyl isocyanate, 1,3-butylene glycol, and trimethylolpropane. The prepolymer is prepared in a 40 to 60 weight percent 2-ethoxyethyl acetate solution.

The polyols useful in the preparation of the polyurethane compound of this invention are those selected from the group comprising polyether polyols, polyester polyols, and other hydroxy terminated polymers, e.g., hydroxy terminated polybutadiene. The polyols used herein have molecular weights in the range of 400 to 5000 and, preferably in the range from 700 to 3000.

Examples of suitable polyols include: the polyester polyol derived from the reaction of adipic acid, diethylene glycol and glycerin; the polyester polyol derived from the reaction of phthalic and adipic acid, ethylene glycol, and glycerin; a poly(oxypropylene)triol which is the polyether triol derived from propylene oxide and 1,2,6-hexanetriol; and poly(oxybutylene)glycol which is a polyether polyol derived from the base catalysted polymerisation of 1,2 or 2,3-butylene oxide.

The preferred polyol is commercially available as Niax triol LHT–240, a poly(oxypropylene) triol of 1,2,6-hexanetriol having a hydroxyl number of 230–245, which is a product of Union Carbide Chemical Company.

Another useful polyol is commercially available as Niax triol LHT–112, a poly(oxypropylene) triol of 1,2,6-hexanetriol having a hydroxyl number of 110–114, which is a product of Union Carbide Chemical Company.

Still another useful polyol is commercially available as Desmophen 650, a polyester polyol having a hydroxyl number of 130–430, which is a product of Mobay Chemical Company.

Catalysts useful in the preparation of the polyurethane compound of this invention are those comprising organic soluble metal salts of carboxylic acids having the general formulas $(RCO_2)_xM$, and $(RCO_2)_xMR'_y$ wherein R is an alkyl, a cycloalkyl, or a substituted cycloalkyl group having 5 to 12 carbon atoms, R' is an alkyl or a cycloalkyl group having 1 to 10 carbon atoms, M is a metal such as zinc or tin, $x$ is an integer having a value of 1 or 2, $y$ is an integer having a value of 2.

Examples of catalysts useful herein include zinc octoate and zinc naphthenate. Other examples include dibutyl tin dilaureate, dibutyl tin bis(2-ethylhexoate), and dibutyl tin diacetate.

The polyurethane compound prepared herein utilized dibutyl tin dilaurate to catalyze the reaction between the prepolymer and the polyol.

The solvent useful herein in the preparation of the polyurethane is a combination of organic solvents consisting of an aromatic hydrocarbon and an ester or ether or ketone. The ratio of aromatic hydrocarbon to ester, ether, or ketone can vary over a wide range depending on the particular compounds utilized, keeping in mind the basic requirement that mixed solvents are used to prolong evaporation time in order to permit sufficient cure time. However, the weight ratio of aromatic hydrocarbon to ester, ether or ketone can be in the range from 10:1 to 0.01:1.

It was previously indicated that the solvent component is present in the preparation of the polyurethane to the extent of 30 to 70 percent by weight of the total weight of the components. This specified weight percent range includes the solvent which is present in the prepolymer solution. Thus, the total weight of solvent present in the polyurethane compound preparation includes the weight of solvent in the prepolymer solution and the weight of the combination solvent added during the preparation of the polyurethane. It is therefore the sum of the two solvents which occupies 30 to 70 weight percent of the polyurethane solution and not the combination solvent which is added.

Examples of the aromatic portion of the solvent include toluene, benzene, xylene, ethylbenzene, cumene, and the like.

Examples of the esters useful in the combination solvent include n-butyl acetate, 2-ethoxyethyl acetate, ethyl acetate, isoamyl acetate, ethyl propionate, 2-chloroethyl butyrate, and the like.

Examples of the ethers useful in the combination solvent include n-butyl ether, ethyl ethoxyacetate, ethyl pentyl ether and benzyl methyl ether.

Examples of the ketones useful in the combination solvent include methyl ethyl ketone, methyl isobutyl ketone, methyl β-bromoethyl ketone, cyclohexanone, isopropyl ethyl ketone and the like.

The preferred solvent for addition with the polyol in polyurethane coating formation is a combination of toluene and 2-ethoxyethyl acetate in a weight ratio of toluene to acetate of 2:1.

The diisocyanate

The preferred diisocyanate used in the preparation of the preferred polyurethane compound, as previously mentioned, is a hybrid diisocyanate which is half aromatic and half cycloaliphatic. This diisocyanate, which is 4-[(p-isocyanatophenyl)methyl]cyclohexyl isocyanate, is prepared by the partial hydrogenation of methylene bis(phenylamine) to produce as a product 4-[(p-aminophenyl)methyl]cyclohexylamine which is then treated with phosgene to produce the desired hybrid diisocyanate. The methylene bis(phenylamine) can be prepared by means well known in the art such as by the treatment of aniline with formaldehyde in the presence of an acid which is described in U.S. 3,277,139; the treatment of the methylene bis(phenylamine) with hydrogen is described in U.S. 2,511,028; and the phosgene treatment step is well known in the art and is described in texts such as Roberts and Caserio, "Basic Principles of Organic Chemistry," N.Y., W. A. Benjamin, 1965, page 685.

Referring now to the partial hydrogenation step the method of the art discloses a technique which does not produce a sufficiently pure partially hydrogenated product. The method of the art provides a product which comprises the desired diamine, which is an aromatic-cycloaliphatic diamine, as well as nonhydrogenated starting material, which is an aromatic-aromatic diamine. If no steps are taken to obtain a product having a higher concentration of desired aromatic-cycloaliphatic diamine, then the ultimate polyurethane is produced from a diisocyanate mixture containing an excessive quantity of diisocyanate which does not have the required isocyanate groups of differing reactivity. The ultimate result would be a polyurethane which does not have the resistance to ultraviolet light promoted yellowing, as does the polyurethane of this invention, and which can exhibit vapor toxicity from unreacted diisocyanate.

Accordingly, there is provided a process for separating 4-[(p-aminophenyl)methyl]cyclohexyl amine from a mixture comprising it and methylene bis(phenylamine) together with minor amounts of other material wherein the diamine mixture is treated with acid, the treated mixture is then extracted with a solvent to produce an extract phase containing the aromatic-aromatic diamine and a raffinate phase containing the acid salt of the desired aromatic-cycloaliphatic diamine; the extract and raffinate phases are separated and the raffinate phase is treated with a strong base to regenerate the amine, the regenerated amine—which is the desired aromatic-cycloaliphatic amine—is extracted with a solvent to produce an extract phase containing the desired amine and an aqueous raffinate phase; after phase separation the extraction phase is distilled to separate the desired amine from the solvent. This separation process produces the desired amine of sufficient purity and analysis shows that the product is substantially free of aliphatic-aliphatic diamine and aromatic-aromatic diamine contaminants.

The acid utilized herein is an aqueous mineral acid such as hydrochloric acid, sulfuric acid, phosphoric acid and the like which is added to the diamine mixture in amount stoichiometrically equivalent to the aliphatic amine function. The success of this separation process is due to the preference shown by the mineral acid for the aliphatic amine. The acid reaction converts the aliphatic amine to its corresponding water soluble acid salt with the aromatic amine being unaffected and with the aromatic-aromatic diamine similarly being unaffected.

After the acid treatment the treated mixture is solvent extracted with a suitable organic solvent for the aromatic-aromatic diamine. The extraction produces an organic extract phase containing the aromatic-aromatic diamine and an aqueous raffinate phase containing the desired aromatic-aliphatic constituent.

Examples of suitable organic solvents for this first extraction step are selected from those which most strongly exclude water and include chloroform, carbon tetrachloride, dichlorobenzene and the lighter liquid fluorocarbons.

The aqueous raffinate phase containing the acid salt of the aromatic-aliphatic amine is reacted with a strong base such as sodium hydroxide, potassium hydroxide, ammonium hydroxide, barium hydroxide and calcium hydroxide to regenerate the aliphatic amine group. An amount of base stoichiometrically equivalent to the mineral acid originally added to the diamine mixture is added to the raffinate phase to regenerate the amine.

The solution from the amine regeneration is next treated with an organic solvent for the aromatic-aliphatic diamine. The extraction produces an organic extract phase containing the desired aromatic-aliphatic diamine dissolved in solvent and an aqueous raffinate phase.

Organic solvents suitable for this second extraction are the same as used in the first extraction.

The extract phase from the second extraction step is next treated in a distillation zone to separate the solvent and 4-[(p-aminophenyl)methyl]cyclohexylamine which by this time is in substantially pure concentration.

If desired, the extract phase from the second extraction step can be dried with a suitable drying agent such as anhydrous magnesium sulfate, anhydrous sodium sulfate, anhydrous calcium chloride and the like and then filtered prior to the distillation step.

The invention is further illustrated rather than limited by the following examples in which parts are by weight unless otherwise specified.

EXAMPLE 1

Preparation of 4-[(p-aminophenyl)methyl]cyclohexylamine 4,4'-methylene bis(phenylamine) was hydrogenated in three equal portions. Each portion was hydrogenated as follows: Methylene bis(phenylamine) (200 g., 1.01 mol), dioxane (300 g.), and 5 percent ruthenium on carbon catalyst (10 g.) were charged to a 1600 ml. bomb. The bomb was purged three times with hydrogen, and then agitated for 13 hours at 150° C. with hydrogen pressure varying between 1100 and 1575 p.s.i.g. The product from one run and the combined products from the other two runs were each distilled, the distillates were combined, and fractionated. The 255 g. fraction of the combined distillate boiling in the range between 162 and 180° C. at 0.7 mm. was retained, thus excluding methylene bis(cyclohexylamine) (B.P. 131° C. at 1.0 mm.).

A 36.3 g. portion of the above-mentioned distillate was reserved for analysis. Potentiometric titration indicated, based on the absence of methylene bis(cyclohexylamine), that the composition of the remaining 218.7 g. was: 4-[(p-aminophenyl)methyl] cyclohexylamine, 82.0 percent; methylene bis(phenylamine), 13.9 percent; material unaccounted for, 4.1 percent.

This 218.7 g. (0.879 aliphatic amine equivalent) portion of the abovementioned distillate in molten form was slowly poured into a stirred mixture of concentrated hydrochloric acid (87.5 g., 0.89 equivalent) in 2000 ml. of distilled water. The solution was stirred vigorously for one hour and the pH stabilized at 8.2. The pH was adjusted to 7.35 by the addition of concentrated hydrochloric acid (0.7 g.). The resulting mixture was extracted four times with 150 ml. portions of chloroform. The chloroform extracts were discarded and the aqueous phase was made alkaline by the addition of a solution of sodium hydroxide (40 g., 1 equivalent) in 160 ml. of water. This alkaline mixture was then extracted four times with 150 ml. portions of chloroform. The aqueous phase was discarded and the chloroform extracts were dried over anhydrous magnesium sulfate. The chloroform solution was filtered from the drying agent and distilled to remove chloroform leaving a residue of 170.8 g. Fractionation of this residue through a column packed with glass rings gave the following distillate fractions.

|  | Vapor temp., °C. | Column pressure, mm. Hg | Net wt., g. |
| --- | --- | --- | --- |
| Distillate fraction: |  |  |  |
| 1 | 141–150 | 0.7 | 5.1 |
| 2 | 160 | 0.7 | 20.1 |
| 3 | 163 | 0.7 | 126.1 |
| Residue |  |  | 6.4 |

Analyses of distillate fraction 3 indicated that it was the desired 4-[(p-aminophenyl)methyl] cyclohexylamine, substantially free of the wholly aliphatic and wholly aromatic diamine contaminants.

ANALYSES OF FRACTION 3

|  | Calculated for $C_{13}H_{20}N_2$ | Found |
| --- | --- | --- |
| Carbon, wt. percent | 76.4 | 76.5 |
| Hydrogen, wt. percent | 9.9 | 9.9 |
| Nitrogen, wt. percent | 13.7 | 13.6 |
| Proton distribution (NMR): |  |  |
| On aromatic ring, percent | 20.0 | 19.7 |
| Other, percent | 80.0 | 80.3 |
| Neutralization equivalent (aliphatic amine) | 204.3 | 211.0 |

Essentially equivalent amounts of aromatic and aliphatic amine functionalities were indicated by the potentiometric titration. Additionally, a resonance at 6.3 tau in the NMR Spectrum of authentic methylene bis(phenylamine), assigned to the protons of the methylene group adjacent to the two aromatic rings, was absent in the spectrum of fraction 3. This absence of resonance at 6.3 tau eliminates the possibility that fraction 3 could be merely a 50:50 mixture or any other mixture of methylene bis(cyclohexylamine) and methylene bis(phenylamine).

EXAMPLE 2

Preparation of 4-[(p-isocyanatophenyl)methyl] cyclohexyl isocyanate

Using the desired product made in Example 1 above (distillate fraction 3) the desired aromatic-cycloaliphatic diisocyanate was prepared according to the following procedure.

To a stirred solution of 4-[(p-aminophenyl)methyl] cyclohexylamine (115.0 g., 0.56 mole) in 400 ml. of absolute methyl alcohol was slowly added 128.0 g. (1.3 mole) of concentrated hydrochloric acid. The solution was poured into 3–1 of acetone; the hydrochloride salt separated as an oil. Most of the solvent was stripped out and the resulting glassy residue was digested in 300 ml. of refluxing isopropyl alcohol. Insoluble white solid was filtered off, washed with isopropanol, and vacuum dried leaving 146.2 g. of product. The alcohol filtrate was stirred into 3–1 of acetone, and then the precipitated solid was collected on a filter, washed with acetone and vacuum dried, leaving 9.8 g. of very hygroscopic solid. The total yield of the dihydrochloride salt was 156.0 g. (100%).

Avoiding atmospheric moisture, the dried dihydrochloride salt was pulverized and then suspended in 1000 ml. of o-dichlorobenzene. The mixture was cooled to 0° C., and 225 g. (2.28 mole) of phosgene was distilled into the flask from a cylinder. The stirred mixture was very slowly warmed to 150° C. in 3 hours (phosgene was started through the sparger at 25° C.), and was held at 150–160° C. for 7 hours. The solution finally cleared and darkened, and HCl evolution stopped. The o-dichlorobenzene was stripped off (83° C., 30 mm. Hg) and the residue was distilled through a 10-inch Vigreux column, affording 126.4 g. of colorless 4-[(p-isocyanatophenyl)methyl] cyclohexyl isocyanate (87.5 percent yield), B.P. 164–177° C., 0.55–0.8 mm. Hg.

*Analysis.*—Calculated for $C_{15}H_{16}N_2O_2$ (percent): C, 70.3; H, 6.3; N, 10.9; O, 12.5; NCO, 32.8. Found (percent): C, 70.5; H, 6.6; N, 10.6; NCO, 32.6.

EXAMPLE 3

Preparation of prepolymer

Using the diisocyanate prepared in Example 2 above, the preferred prepolymer was prepared according to the following procedure.

4-[(p-isocyanatophenyl)methyl]cyclohexyl isocyanate (64.1 g., 0.25 mole), trimethylolpropane (5.60 g., 0.042 mole), 1,3-butylene glycol (5.65 g., 0.063 mole), and 2-ethoxyethanol (75.4 g.) were stirred under anhydrous conditions at 60° C. until periodic analyses indicated that the theoretical free isocyanate content had been reached (14.5 hrs.). The prepolymer, thus prepared, was stored under nitrogen in bottles which had been previously washed first in 50 weight percent aqueous sulfuric acid, second in water and then rigorously dried.

EXAMPLE 4

Preparation of polyurethane coating 15.8 gm. of the prepolymer solution prepared in Example 3 (7.9 g. prepolymer in 7.9 g. of 2-ethoxyethanol) was combined with Niax triol LHT-240, a poly(oxypropylene) triol of 1,2,6-hexane triol (5.0 g.), a solvent mixture consisting of toluene (3.33 g.) and 2-ethoxyethanol (1.66 g.), and a catalyst, dibutyltin dilaurate (0.013 g.). The resulting formulation was applied as a coating with a No. 60 RDS rod to 1-inch by 3-inch microscope slides and to 3-inch by 6-inch plate glass, aluminum and steel panels. Smooth, glossy, clear films resulted after a period of 8-24 hours. The coated materials were allowed to harden for one week.

EXAMPLE 5

Evaluation of light-stability

Table 1 contrasts the light stability of the novel polyurethane coating of this invention, which was prepared from the aromatic-aliphatic diisocyanate as described in Examples 3 and 4, with the three most closely related polyurethane coatings which are: polyurethane coating "A," prepared from the analogous aromatic diisocyanate (methylene bis[phenyl isocyanate]), polyurethane coating "B," prepared from the analogous aliphatic-aliphatic diisocyanate (methylene bis[cyclohexyl isocyanate]) and polyurethane coating "C," prepared from equimolar quantities of methylene bis(phenyl isocyanate) and methylene bis(cyclohexyl isocyanate). Polyurethane coating "C" specifically is the product of the combination of equivalent quantities of the respective prepolymers "A" and "B" prior to reaction with Niax triol LHT-240, a poly(oxypropylene) triol of 1,2,6-hexane triol. Polyurethane coating "C" thus was made from the same 1:1 ratio of aromatic isocyanate groups to aliphatic isocyanate groups as in 4[(p-isocyanatophenyl)methyl]cyclohexyl isocyanate but with the aromatic isocyanate groups on different molecules than those containing the aliphatic isocyanate groups. Polyurethane coating "C" was prepared in the manner indicated above as a precaution to insure the normally complete utilization of isocyanate groups thus validating coating "C" for comparison to the other polyurethane coatings.

The same polyols, solvents and catalysts were employed in preparing polyurethane coatings A, B, and C as were employed in Examples 3 and 4.

Particular care and substantial inconvenience was involved in preparing polyurethane coating "B." The prepolymer and coating formulation from methylene bis (cyclohexyl isocyanate) solidified by crystallization at room temperature; it was therefore necessary to keep the materials warm during application. However, warming accelerates curing and leads to rather rapid gelation after mixing the prepolymer and triol and, accordingly, panels had to be coated quickly. Prepolymers from 4-[(p-isocyanatophenyl)methyl] cyclohexyl isocyanate and methylene bis(phenyl isocyanate) were liquid at room temperature, and no difficulty was experienced with premature gelation resulting from crystallization or reaction.

TABLE 1

| | Polyurethane coating and parent diisocyanate | | | |
|---|---|---|---|---|
| | A | B | C | Invention |
| Yellowness Index[1] at— | Methylene bis(phenyl isocyanate) | Methylene bis(cyclohexyl isocyanate) | 1:1 methylene bis(phenyl isocyanate) to methylene bis (cyclohexyl isocyanate) | 4-[(p-isocyanatophenyl) methyl]cyclohexyl isocyanate |
| 400 hrs | 27.1 | 1.9 | 19.5 | 4.7 |
| 800 hrs | 31.3 | 3.3 | (²) | 9.5 |

[1] The degree of yellowness of the coatings (Yellowness Index, YI) was determined by ASTM Method D1925-63T, using a Gardner Multipurpose Reflectometer (MI) equipped with an M-6 attachment for measuring light transmission. For calibration, the reflectometer was adjusted to indicate 100 percent light transmission through a clean uncoated microscope slide supported in the light beam from three instrument filters (amber, green and blue). The calibration slide was replaced with a coated test specimen and the percent of light from the three filters transmitted by the specimen was measured. Readings from two measurements were averaged; the instrument was calibrated frequently. The yellowness index was calculated from the equation, YI=(A-B)(100)/G, where A, B and G were the percentages of light from the respective filters transmitted by the coatings.

After measuring the initial yellowness index, the coated slides were placed in an Atlas Weatherometer, maintained at 50 percent relative humidity and 140°F. using a Xenon light source; coated sides faced the light. Periodically, the specimens were removed and yellowness indices were determined.

² Not determined.

Surprisingly, the polyurethane coating of the invention decidedly outperforms coating "C" which, as explained above, was made from the same 1:1 ratio of aromatic to aliphatic isocyanate groups as in the coating of the invention, but with the aromatic isocyanate groups on different molecules than those containing the aliphatic isocyanate groups. While, indeed, the performance of coating "C" roughly approximates an average of the performance of coatings "A" and "B," the performance of the coating of the invention far excels coating "C." At the 400-hour interval, for example, while the YI (Yellowness Index) of coating "B" represents a 93 percent improvement over coating "A," and the YI of coating "C" represents only a 28 percent improvement, the YI of the coating of the invention represents an 83 percent improvement. In other words, the coating of the invention constitutes an improvement in performance about three times that afforded by coating "C." Not only is this a wholly unexpected result but it clearly establishes that the improvement accruing from the use of 4-[(p-isocyanophenyl)methyl] cyclohexyl isocyanate is not the statistical result of a 50 percent dilution of aromatic isocyanate groups by aliphatic isocyanate groups. On the contrary, the coating of the invention has been found to represent an important new contribution to the art of developing light-stable polyurethane coatings.

Reasonable variations and modifications of this invention can be made, or followed, in view of the foregoing disclosure, without departing from the spirit or scope thereof.

What is claimed is:

1. A composition of matter prepared by the reaction of a diisocyanate with a polyol wherein said polyol is selected from the group consisting of aliphatic and cycloaliphatic diols, triols, and mixtures thereof having a molecular weight in the range of 60 to 5000 and said diisocyanate is represented by the general formula

$$OCN—R_1—R_2—R_3—NCO$$

wherein said —NCO group attached to $R_1$ is more reactive than said —NCO group attached to $R_3$, $R_1$ being an aromatic group, $R_2$ being an aliphatic group having up to 20 carbon atoms or a direct bond, and $R_3$ being selected from the group consisting of 1,4-cyclohexylene and substituted-1,4-cyclohexylene wherein the substituents are characterized by the absence of reactive hydrogen atoms and further wherein the quantity of said polyol reacted with said diisocyanate provides substantially the quantity of hydroxyl groups required to react with the quantity of said more reactive —NCO groups present to thus produce said composition.

2. The composition of matter of claim 1 wherein said polyol and said diisocyanate are combined to provide a ratio of isocyanate groups to hydroxyl groups in the range of 1.5:1 to 2.5:1.

3. The composition of matter of claim 2 wherein said polyol has a molecular weight in the range of 60 to 300 and is comprised of a mixture of diols and triols.

4. The composition of matter of claim 3 wherein said diisocyanate is 4[(p-isocyanatophenyl)methyl]cyclohexyl isocyanate.

5. The composition of matter of claim 4 wherein said diol is 1,3-butylene glycol and said triol is trimethylolpropane.

6. The composition of matter of claim 4 wherein said polyol comprises a mixture of lower molecular weight polyols and higher molecular weight polyols wherein said lower molecular weight polyols have molecular weights in the range of 60 to 300 and said higher molecular weight polyols have molecular weights in the range of 400 to 5000.

7. A polyurethane composition prepared by the reaction of a second polyol with the composition of matter defined by claim 3 wherein said second polyol and said composition of matter are present in such quantity to provide a ratio of isocyanate groups to hydroxyl groups in the range of 1:1 to 1.5:1.

8. The polyurethane composition of claim 7 wherein said second polyol has a molecular weight in the range of 400 to 5000 and is selected from the group consisting of polyether polyols and polyester polyols.

9. The polyurethane composition of claim 8 wherein said second polyol is a polyether triol of propylene oxide and 1,2,6-hexane triol having a hydroxyl number of 230–245.

10. The polyurethane compound of claim 9 wherein said composition of matter is prepared by the reaction of 1,3-butylene glycol, trimethylolpropane, and 4-[(p-isocyanatophenyl)methyl]cyclohexyl isocyanate.

References Cited
UNITED STATES PATENTS

| | | | |
|---|---|---|---|
| 3,448,139 | 6/1969 | Farrissey et al. | 260—77.5 |
| 2,729,666 | 1/1956 | Stallman | 260—77.5 |
| 3,503,934 | 3/1970 | Chilvers | 260—77.5 |

DONALD E. CZAJA, Primary Examiner

E. C. RZUCIDLO, Assistant Examiner

U.S. Cl. X.R

260—75 NT, 77.5 AP